(12) United States Patent
Lee et al.

(10) Patent No.: US 11,782,567 B2
(45) Date of Patent: Oct. 10, 2023

(54) TOUCH DISPLAY DEVICE

(71) Applicant: LG Display Co., Ltd., Seoul (KR)

(72) Inventors: SoJung Lee, Paju-si (KR); Youngjun Choi, Incheon (KR); HyeMi Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/978,680

(22) Filed: Nov. 1, 2022

(65) Prior Publication Data

US 2023/0185413 A1 Jun. 15, 2023

(30) Foreign Application Priority Data

Dec. 13, 2021 (KR) .................. 10-2021-0177267

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05); *G06F 2203/04103* (2013.01)

(58) Field of Classification Search
CPC ............................ G06F 3/0446; G06F 3/0412
See application file for complete search history.

(56) References Cited

U.S. PATENT DOCUMENTS

2020/0004368 A1* 1/2020 Kim ...................... G06F 3/0446

* cited by examiner

*Primary Examiner* — Robin J Mishler
(74) *Attorney, Agent, or Firm* — Fenwick & West LLP

(57) ABSTRACT

Embodiments of the present disclosure are related to a touch display device, as a touch sensor connecting pattern for a connection between touch sensors or a connection between a touch sensor and a touch routing line is disposed by using a same material with a voltage line disposed on a subpixel. Thus, an electrode structure for a touch sensing can be implemented while reducing a manufacturing process. Furthermore, as the voltage line is disposed to overlap at least a part of the touch sensor and the touch routing line, a performance of the touch sensing can be improved by reducing an influence that a parasitic capacitance by a driving of a light-emitting element affects the touch sensing.

20 Claims, 12 Drawing Sheets

TOUCH DISPLAY DEVICE

CROSS REFERENCE TO RELATED APPLICATION

This application claims priority from Republic of Korea Patent Application No. 10-2021-0177267, filed on Dec. 13, 2021, which is hereby incorporated by reference in its entirety.

BACKGROUND

Field

Embodiments of the present disclosure are related to a touch display device.

Description of Related Art

Display devices, for providing various functions to the user, can recognize a touch of a user on a display panel and perform an input process based on the recognized touch.

The display devices, for example, can include a plurality of touch sensors disposed on the display panel, or imbedded in the display panel. The display devices can detect a change of a capacitance by the touch of the user in a state that the touch sensor is driven and sense the touch of the user.

In the case that the touch sensor is disposed on the display panel, an entire thickness of the display device can increase. In the case that the touch sensor is embedded in the display panel, a complexity of a manufacturing process of the display panel can increase. Furthermore, a performance of a touch sensing can drop due to a parasitic capacitance between the touch sensor and an electrode for a display driving.

SUMMARY

Embodiments of the present disclosure can provide methods being capable of simplifying a manufacturing process of a touch display device in which a touch sensor is embedded and improving a performance reduction of touch sensing due to a parasitic capacitance according to a display driving.

Embodiments of the present disclosure can provide a touch display device including a plurality of touch sensors disposed in a display panel, a plurality of touch routing lines electrically connected to at least one of the plurality of touch sensors, at least one voltage line disposed to overlap at least a part of the plurality of touch sensors or the plurality of touch routing lines and configured to supply a constant voltage, and a touch sensor connecting pattern disposed on a layer where the at least one voltage line is disposed and electrically connected to at least one of the plurality of touch sensors or the plurality of touch routing lines.

Embodiments of the present disclosure can provide a touch display device including a plurality of touch sensors and a plurality of touch routing lines on a substrate, a touch planarization layer on the plurality of touch sensors and the plurality of touch routing lines, at least one voltage line on the touch planarization layer and overlapping at least a part of the plurality of touch sensors or the plurality of touch routing lines, and a touch sensor connecting pattern disposed on a layer where the at least one voltage line is disposed and electrically connected to at least one of the plurality of touch sensors or the plurality of touch routing lines.

Embodiments of the present disclosure can provide a touch display device including a plurality of touch sensors and a plurality of touch routing lines on a substrate, at least one voltage line on the plurality of touch sensors and the plurality of touch routing lines and overlapping at least a part of the plurality of touch sensors or the plurality of touch routing lines, and a touch sensor connecting pattern disposed on an area other than an area where the at least one voltage line is disposed on a layer where the at least one voltage line is disposed and electrically connected to at least one of the plurality of touch sensors or the plurality of touch routing lines.

According to various embodiments of the present disclosure, as a touch sensor connecting pattern for a connection between touch sensors or a connection between a touch sensor and a touch routing line is disposed on a layer where a voltage line is disposed, a structure of an electrode for a touch sensing can be implemented in a display panel while minimizing a manufacturing process that the electrode for the touch sensing is disposed.

According to various embodiments of the present disclosure, as a voltage line is disposed to overlap on at least a part of a touch sensor and a touch routing line disposed in a display panel, a parasitic capacitance between an electrode for a display driving and an electrode for a touch sensing can be reduced without adding a separate manufacturing process and a performance of the touch sensing can be improved.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
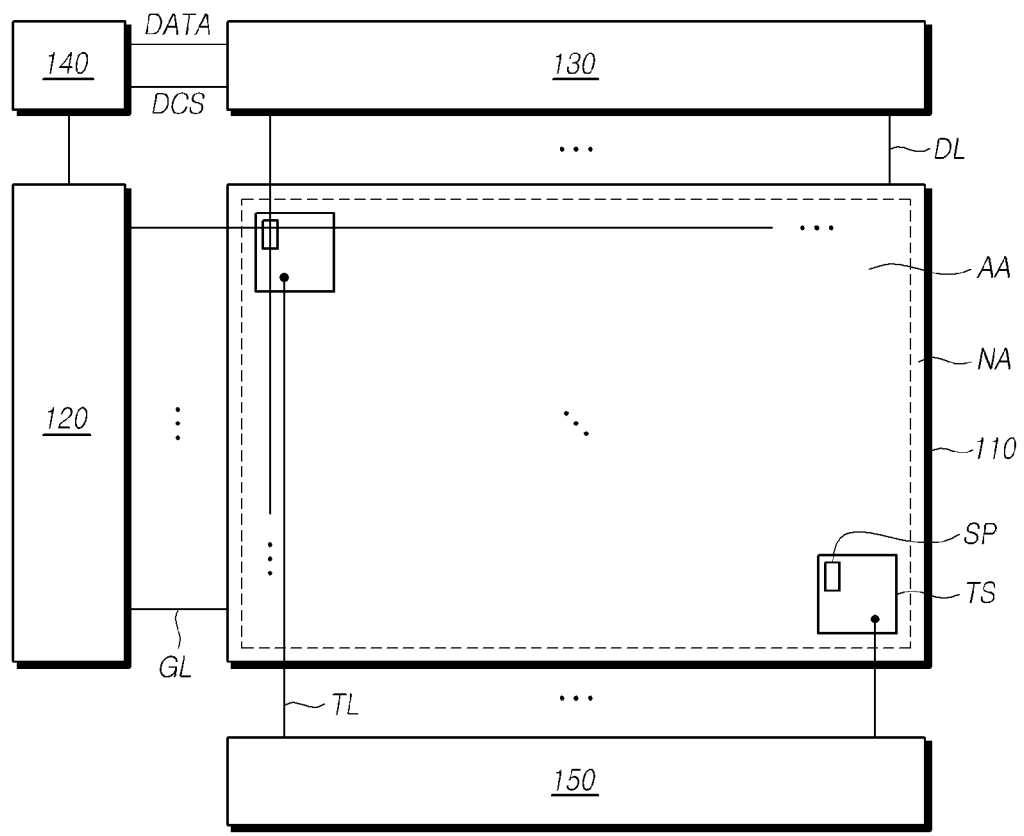
FIG. 1 is a diagram schematically illustrating a configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a diagram schematically illustrating a configuration of a touch display device 100 according to embodiments of the present disclosure.

Referring to FIG. 1, the touch display device 100 can include a display panel 110 including an active area AA on which a plurality of subpixels SP are disposed, and a non-active area NA positioned outside of the active area AA.

The touch display device 100 can include a gate driving circuit 120, a data driving circuit 130, and a controller 140 for driving various signal lines disposed in the display panel 110.

A plurality of gate lines GL and a plurality of data lines DL can be arranged on the display panel 110. Subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC. The gate driving circuit 120 can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Alternatively, each gate driver integrated circuit GDIC can be implemented by a gate-in-panel GIP method to then be directly arranged on the display panel 110. Alternatively, the gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data DATA from the controller 140 and converts the image data DATA into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data DATA.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Alternatively, each source driver integrated circuit SDIC can be directly disposed on the display panel 110. Alternatively, the source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 can supply various control signals to the gate driving circuit 120 and the data driving circuit 130, and control the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system) the display device 100, various timing signals including a vertical synchronization signal VSYNC, a horizontal synchronization signal HSYNC, an input data enable signal DE, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The touch display device 100 can further include a power management integrated circuit (not shown) for supplying various voltages or currents to the display panel 110, the gate driving circuit 120, the data driving circuit 130, and the like or controlling various voltages or currents to be supplied thereto.

A liquid crystal can be disposed on each subpixel SP or a light-emitting element ED can be disposed on each subpixel SP according to types of the display panel 110. Furthermore, an electrode to which a data voltage is applied and an electrode to which a common voltage is applied or the like can be disposed on the subpixel SP.

Furthermore, the touch display device 100 can include a sensor, a line, and a driving circuit or the like for sensing a touch of a user on the display panel 110.

For example, the touch display device 100 according to embodiments of the present disclosure can include a plurality of touch sensors TS positioned on the active area AA, a touch driving circuit 150 driving the touch sensors TS, and a plurality of touch routing lines TL connecting together the touch sensors TS and the touch driving circuit 150. Furthermore, the touch display device 100 can include a touch controller (not illustrated) controlling the touch driving circuit 150, and sensing a touch based on a signal detected by the touch driving circuit 150.

The touch sensor TS, for example, can be a transparent electrode, or an opaque electrode having at least a part that is opened.

In the case that the touch sensor TS includes the opened portion, the touch sensor TS can be a mesh shape. The opened portion of the touch sensor TS can overlap a light-emitting area disposed on each subpixel SP.

According to an arrangement structure of the touch sensor TS and a touch sensing method, one touch routing line TL can be connected to a plurality of touch sensors TS, or at least one touch routing line TL can be connected to each touch sensor TS.

For example, the plurality of touch sensors TS can include a plurality of touch sensors TS connected in an X-axis direction, and a plurality of touch sensors TS connected in a Y-axis direction. And the touch routing line TL electrically connected to the touch sensors TS connected in the X-axis direction and the touch routing line TL electrically connected to the touch sensors TS connected in the Y-axis direction can be disposed.

In this case, the plurality of touch sensors TS can be disposed on a same layer. Some of the plurality of touch sensors TS can be connected by a connecting line disposed on a same layer, and rest of the plurality of touch sensors TS can be connected by a connecting line disposed on a different layer.

When sensing a touch, a touch driving signal can be applied to the plurality of touch sensors TS connected in the X-axis direction or the Y-axis direction and a touch sensing signal can be detected from the plurality of touch sensors TS connected in the Y-axis direction or the X-axis direction. In a state that different signals are applied to the touch sensors TS connected in the X-axis direction and the touch sensors TS connected in the Y-axis direction, a change of a mutual-capacitance between the touch sensors TS generated by a touch can be detected and the touch can be sensed.

In another example, the plurality of touch sensors TS can be disposed to be separated from each other, the touch routing lines TL can be electrically connected to each touch sensors TS.

In this case, the plurality of touch sensors TS can be disposed on a same layer. The plurality of touch routing lines TL can be disposed on a layer different from a layer where the touch sensors TS are disposed. Each of the plurality of touch routing lines TL can be electrically connected to each of the plurality of touch sensors TS. A part of the touch routing line TL can be overlapped with the touch sensor TS which is not electrically connected to the above touch routing line TL.

The touch driving signal can be supplied to the touch sensor TS through the touch routing line TL, and a change of a self-capacitance detected through the touch routing line TL can be detected and the touch can be sensed.

Alternatively, in some cases, in a state that the touch sensors TS connected in the X-axis direction and the touch sensors TS connected in the Y-axis direction are disposed, a sensing based on the mutual-capacitance and a sensing based on the self-capacitance can be performed.

The touch driving circuit 150 can output the touch driving signal to the touch sensor TS through the touch routing line TL, and can detect the touch sensing signal from the touch sensor TS.

The touch driving circuit 150, for example, can include an operational amplifier to be connected to the touch routing line TL and supply the touch driving signal and receive the touch sensing signal, and a feedback capacitor to accumulate a charge according to a signal received by the operational amplifier. Furthermore, the touch driving circuit 150 can include an integrator to process an output signal of the operational amplifier, a sample and hold circuit and an analog digital convertor or the like.

The touch driving circuit 150 can convert the touch sensing signal detected from the touch sensor TS to a sensing data of a digital type and transmit to the touch controller. The touch controller can detect whether the touch is present or absent and a touch coordinate based on the sensing data received from the touch driving circuit 150.

The touch driving circuit 150 can be disposed on a separate circuit in the display panel 110, in some cases, can be disposed to be implemented as an integrated type with the data driving circuit 130 or the like.

Embodiments of the present disclosure can drive the touch sensor TS included in the touch display device 100 and can sense the touch of the user on the display panel 110. Furthermore, the touch sensor TS can be disposed on the display panel 110, or disposed as an imbedded type in the display panel 110.

In the case that the touch sensor TS is disposed as an embedded type in the display panel 110, according to types of the touch display device 100, a structure that the touch sensor TS is disposed can be different.

For example, the touch sensor TS, in the case that the touch display device 100 is a top emission structure, can be disposed on an encapsulation layer protecting a light-emitting element in the display panel 110.

Alternatively, the touch sensor TS, in the case the touch display device 100 is a bottom emission structure, can be disposed under the light-emitting element. The touch sensor TS can be implemented by using at least some of layers constituting the light-emitting element in the display panel 110.

Figure 2:
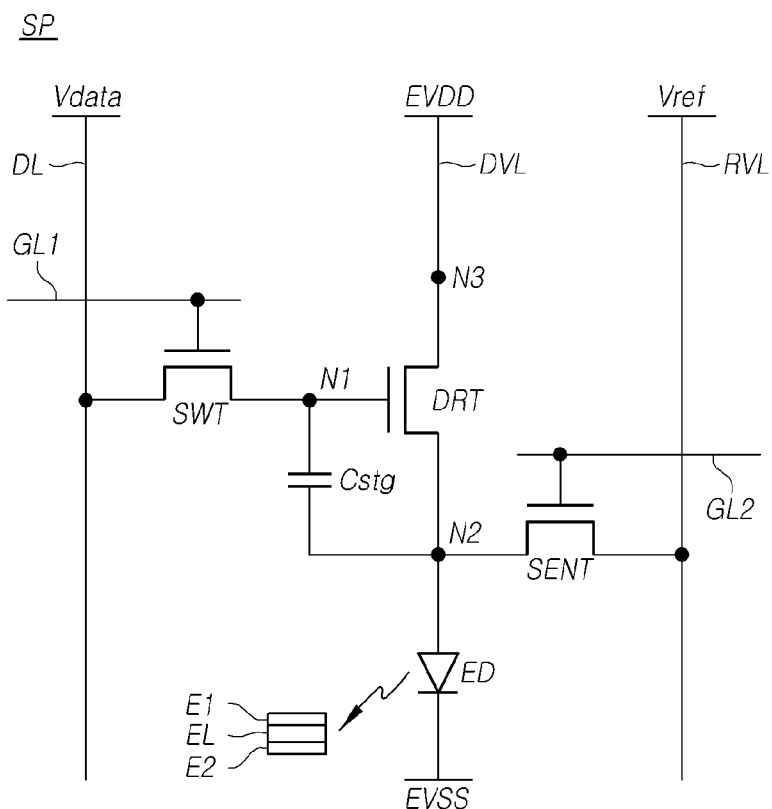
FIG. 2 is a diagram illustrating an example of a circuit structure of a subpixel included in a touch display device according to embodiments of the present disclosure.

FIG. 2 is a diagram illustrating an example of a circuit structure of the subpixel SP included in the touch display device 100 according to embodiments of the present disclosure.

FIG. 2 illustrates an example of a circuit structure of the subpixel SP in the case that the touch display device 100 is an organic light-emitting display device, but embodiments of the present disclosure can apply to other types of display devices.

Referring to FIG. 2, a light-emitting element ED and a driving transistor DRT for driving the light-emitting element ED can be disposed on the subpixel SP. Furthermore, at least one circuit element other than the light-emitting element ED and the driving transistor DRT can be further disposed on the subpixel SP.

For example, such as an example illustrated in FIG. 2, a switching transistor SWT, a sensing transistor SENT, and a storage capacitor Cstg can be further disposed on the subpixel SP.

Thus, an example illustrated in FIG. 2 represents 3T1C structure that three thin film transistors and one capacitor other than the light-emitting element ED are disposed on the subpixel SP as an example, but embodiments of the present disclosure are not limited to this. Furthermore, an example illustrated in FIG. 2 represents that all of the thin film transistor are N type as an example, but in some cases, the thin film transistor disposed on the subpixel SP can be P type.

The switching transistor SWT can be electrically connected between the data line DL and a first node N1.

The data voltage Vdata can be supplied to the subpixel SP through the data line DL. The first node N1 can be a gate node of the driving transistor DRT.

The switching transistor SWT can be controlled by a scan signal supplied to a first gate line GL1. The switching transistor SWT can control that the data voltage Vdata supplied through the data line DL is applied to the gate node of the driving transistor DRT.

The driving transistor DRT can be electrically connected between a driving voltage line DVL and the light-emitting element ED.

A first driving voltage EVDD can be supplied to a third node N3 through the driving voltage line DVL. The first driving voltage EVDD, for example, can be a high potential driving voltage. The third node N3 can be a drain node or a source node of the driving transistor DRT.

The driving transistor DRT can be controlled by a voltage applied to the first node N1. And the driving transistor DRT can control a driving current supplied to the light-emitting element ED.

The sensing transistor SENT can be electrically connected between a reference voltage line RVL and a second node N2.

A reference voltage Vref can be supplied to the second node N2 through the reference voltage line RVL. The second node N2 can be the source node or the drain node of the driving transistor DRT.

The sensing transistor SENT can be controlled by a scan signal supplied to a second gate line GL2. The second gate line GL2 controlling the sensing transistor SENT can be same as or different from the first gate line GL1 controlling the switching transistor SWT.

The sensing transistor SENT can control the application of the reference voltage Vref to the second node N2. Furthermore, the sensing transistor SENT, in some cases, can control that a voltage of the second node N2 is sensed through the reference voltage line RVL.

The storage capacitor Cstg can be electrically connected between the first node N1 and the second node N2. The storage capacitor Cstg can maintain the data voltage Vdata applied to the first node N1 for one frame.

The light-emitting element ED can be electrically connected between the second node N2 and a line to which a second driving voltage EVSS is supplied. The second driving voltage EVSS, for example, can be a low potential driving voltage.

The light-emitting element ED can include a first electrode E1, a light-emitting layer EL, and a second electrode E2. The first electrode E1 of the light-emitting element ED can be electrically connected to the driving transistor DRT. The second electrode E2 of the light-emitting element ED can be electrically connected to the line to which the second driving voltage EVSS is supplied. The light-emitting layer EL can emit a light according to the driving current supplied by the driving transistor DRT.

When a scan signal of a turn-on level is applied to the first gate line GL1 and the second gate line GL2, the switching transistor SWT and the sensing transistor SENT can be turned-on. The data voltage Vdata can be applied to the first node N1, and the reference voltage Vref can be applied to the second node N2.

The driving current supplied by the driving transistor DRT can be determined according to a difference between a voltage of the first node N1 and a voltage of the second node N2.

The light-emitting element ED can represent a luminance according to the driving current supplied through the driving transistor DRT.

The touch sensor TS and the touch routing line TL can be disposed to avoid at least a part of an area where a light is emitted by the light-emitting element ED on the subpixel SP of the display panel 110.

Figure 3:
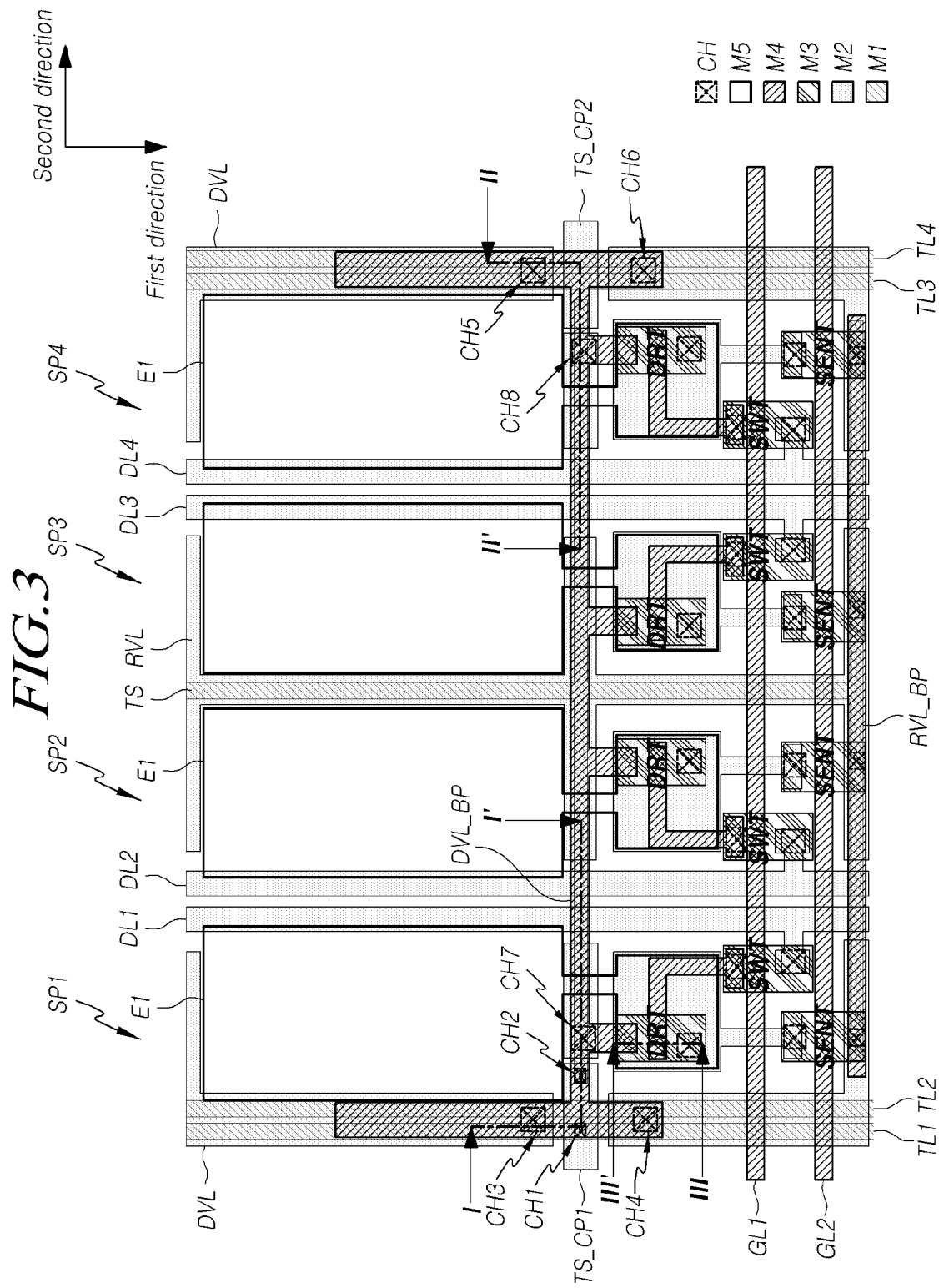
FIG. 3 is a diagram illustrating an example of a plane structure that a touch sensor and a touch routing line are disposed in a touch display device according to embodiments of the present disclosure.
Figure 4:
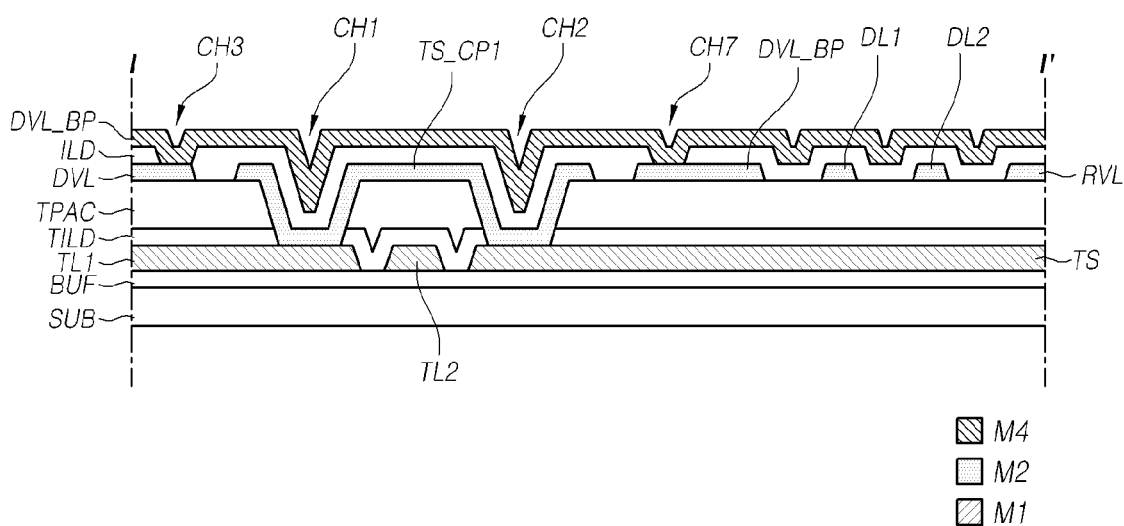
FIG. 4 is a cross-sectional view of I-I' portion illustrated in FIG. 3 according to embodiments of the present disclosure.
Figure 5:
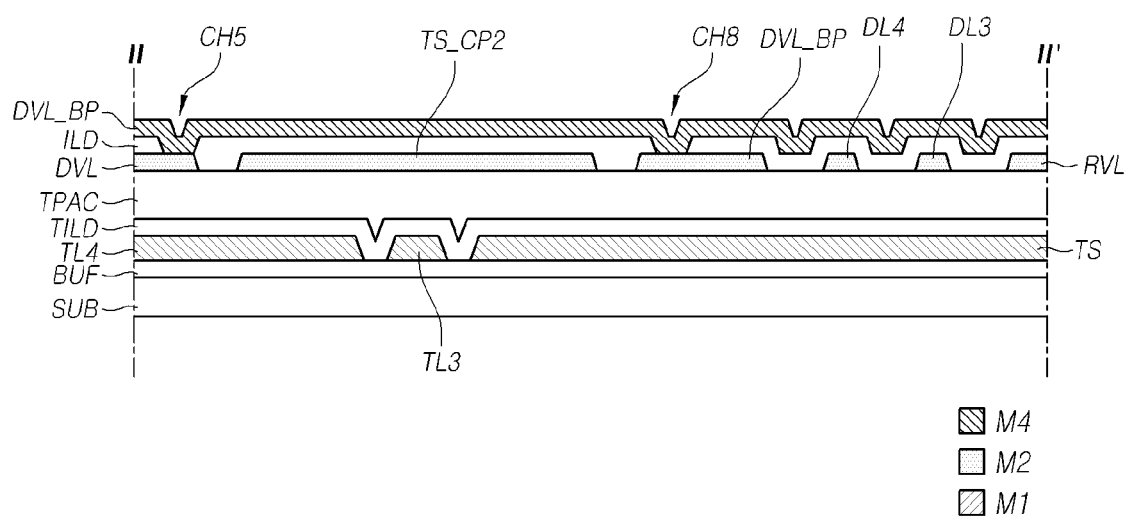
FIG. 5 is a cross-sectional view of II-IF portion illustrated in FIG. 3 according to embodiments of the present disclosure.
Figure 6:
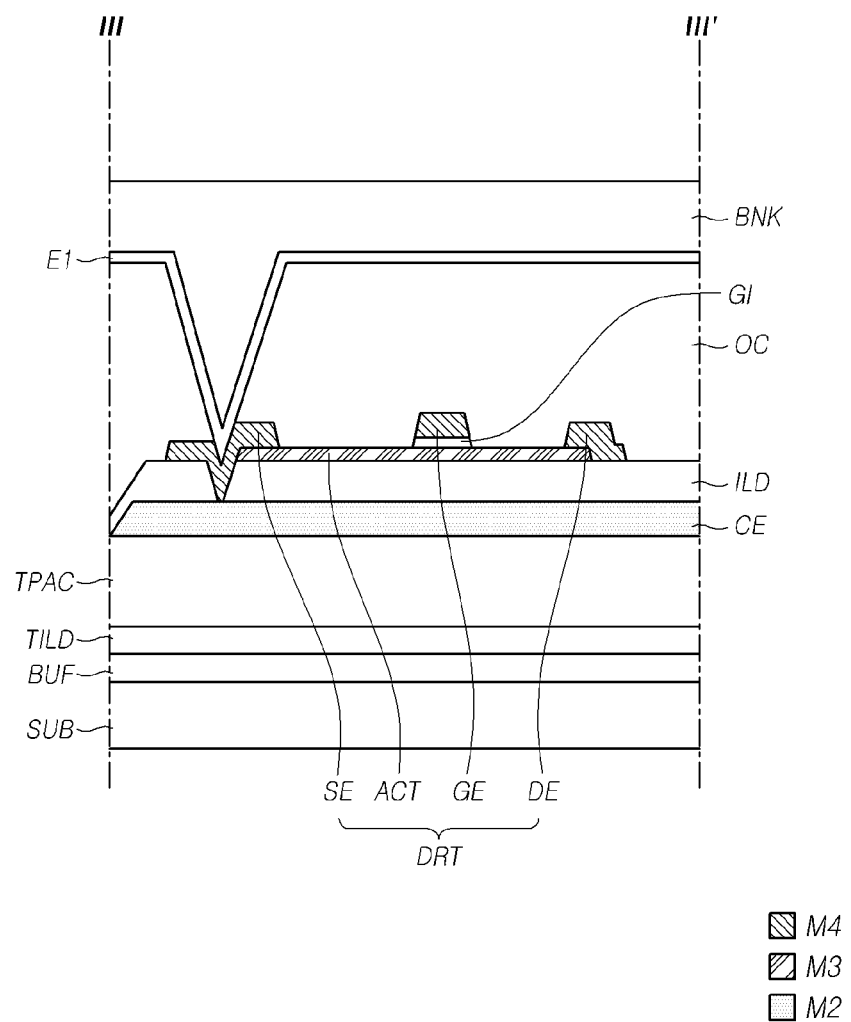
FIG. 6 is a cross-sectional view of portion illustrated in FIG. 3 according to embodiments of the present disclosure.

FIG. 3 is a diagram illustrating an example of a plane structure that the touch sensor TS and the touch routing line TL are disposed in the touch display device 100 according to embodiments of the present disclosure. FIG. 4 is a cross-sectional view of I-I' portion illustrated in FIG. 3 according to embodiments of the present disclosure. FIG. 5 is a cross-sectional view of II-IF portion illustrated in FIG. 3 according to embodiments of the present disclosure. FIG. 6 is a cross-sectional view of portion illustrated in FIG. 3 according to embodiments of the present disclosure.

Referring to FIG. 3, in the case that the touch display device 100 is the bottom emission structure, an example that the touch sensor TS and the touch routing line TL are disposed on four subpixels SP1, SP2, SP3, SP4 disposed in the display panel 110 is illustrated.

Each of the four subpixels SP1, SP2, SP3, SP4 can be an area emitting a light of a different color and can constitute one pixel, but not limited to this. In some cases, three subpixels SP can constitute one pixel, or at least two subpixels SP of the four subpixels SP can emit a light of a same color.

The driving voltage line DVL can be disposed on both sides of the four subpixels SP1, SP2, SP3, SP4. The driving voltage line DVL can be disposed in a first direction. The driving voltage line DVL can supply the first driving voltage EVDD to each subpixel SP through a driving voltage line bridge pattern DVL_BP disposed in a second direction.

In the present disclosure, the driving voltage line DVL disposed in the first direction can be referred to a first portion of the driving voltage line DVL, and the driving voltage line bridge pattern DVL_CP disposed in the second direction can be referred to a second portion of the driving voltage line DVL.

The reference voltage line RVL can be disposed between the second subpixel SP2 and the third subpixel SP3.

The reference voltage line RVL can be disposed in the first direction. The reference voltage line RVL can supply the reference voltage Vref to each subpixel SP through a reference voltage line bridge pattern RVL_BP disposed in the second direction.

In the present disclosure, the reference voltage line RVL disposed in the first direction can be referred to a first portion of the reference voltage line RVL, and the reference voltage line bridge pattern RVL_BP disposed in the second direction can be referred to a second portion of the reference voltage line RVL.

A first data line DL1 and a second data line DL2 can be disposed between the first subpixel SP1 and the second subpixel SP2. The first data line DL1 can supply the data voltage Vdata to the first subpixel SP1, and the second data line DL2 can supply the data voltage Vdata to the second subpixel SP2.

A third data line DL3 and a fourth data line DL4 can be disposed between the third subpixel SP3 and the fourth subpixel SP4. The third data line DL3 can supply the data voltage Vdata to the third subpixel SP3, and the fourth data line DL4 can supply the data voltage Vdata to the fourth subpixel SP4.

Above-mentioned arrangement structure of the driving voltage line DVL, the reference voltage line RVL and the data line DL is one example, an order that each voltage line is disposed can be different from this. For example, positions that the driving voltage line DVL and the reference voltage line RVL are disposed can be opposite. Alternatively, in some cases, one data line DL can be disposed for two subpixels SP.

Such as described above, in a structure that a voltage line is disposed on the subpixel SP, the touch sensor TS and the touch routing line TL can be disposed to overlap at least one voltage line.

Referring to FIGS. 3, 4, 5 and 6, the touch sensor TS and the touch routing line TL can be disposed on a substrate SUB. The touch sensor TS1 and the touch routing line TL can be disposed by using a first material layer M1.

A buffer layer BUF can be positioned between the substrate SUB and the first material layer M1. In some cases, the buffer layer BUF can be two or more, or may not be disposed.

A touch insulating layer TILD and a touch planarization layer TPAC can be disposed on the touch sensor TS and the touch routing line TL.

At least one insulating layer other than the touch insulating layer TILD and the touch planarization layer TPAC can be disposed on the touch sensor TS and the touch routing line TL. In some cases, the touch insulating layer TILD may not be disposed, and the touch planarization layer TPAC can be disposed. Alternatively, the touch planarization layer TPAC may not be disposed and some insulating layer can be disposed.

The touch planarization layer TPAC can have a substantially constant thickness. A top surface of the touch planarization layer TPAC can be a state to be planarized. In a state that the touch sensor TS and the touch routing line TL are disposed on the substrate SUB, a circuit element and an electrode can be easily disposed on the touch planarization layer TPAC by the touch planarization layer TPAC.

Various voltage lines can be disposed on the touch planarization layer TPAC. The various voltage lines disposed on the touch planarization layer TPAC can be disposed by using a second material layer M2.

For example, the driving voltage line DVL, the reference voltage line RVL and the data line DL can be disposed by using the second material layer M2. A capacitor electrode CE constituting the storage capacitor Cstg can be disposed by using the second material layer M2.

An interlayer insulating layer ILD can be disposed on the second material layer M2.

A circuit element or a signal line using a third material layer M3 or a fourth material layer M4 can be disposed on the interlayer insulating layer ILD. For example, the third material layer M3 can be made of a semiconductor material. The fourth material layer M4 can be made of a metal material.

Referring to FIG. 6, the driving transistor DRT can be disposed on the interlayer insulating layer ILD. An active layer ACT of the driving transistor DRT can be disposed by using the third material layer M3. A gate electrode GE, a source electrode SE and a drain electrode DE of the driving transistor DRT can be disposed by using the fourth material layer M4. A gate insulating layer GI can be disposed between the active layer ACT and the gate electrode GE.

FIG. 6 illustrates an example of an arrangement structure of the driving transistor DRT, but the switching transistor SWT and the sensing transistor SENT disposed on the subpixel SP can be disposed as a similar structure.

The gate line GL, the driving voltage line bridge pattern DVL_BP, the reference voltage line bridge pattern RVL_BP or the like other than the gate electrode GE can be disposed by using the fourth material layer M4.

An overcoat layer OC can be disposed on the fourth material layer M4.

The first electrode E1 of the light-emitting element ED made of a fifth material layer M5 can be disposed on the overcoat layer OC. The fifth material layer M5 can be made a transparent conductive material. Various voltage lines can be positioned between a layer where the light-emitting element ED is disposed and a layer where the touch sensor TS is disposed.

A bank BNK can be disposed on an area other than the light-emitting area on the first electrode E1.

While not illustrated in FIG. 6, the light-emitting layer EL and the second electrode E2 can be disposed on the first electrode E1. An encapsulation layer including at least one inorganic layer or organic layer can be disposed on the second electrode E2.

As FIGS. 3 to 6 illustrate a structure that the touch sensor TS and the touch routing line TL are disposed in the case that the touch display device 100 is the bottom emission structure, such as described above, the touch sensor TS and the touch routing line TL can be disposed by using the first material layer M1 adjacent to the substrate SUB.

At least a part of the touch sensor TS and the touch routing line TL can overlap at least one voltage line positioned on the touch sensor TS and the touch routing line TL.

For example, the touch sensor TS can be disposed to overlap the reference voltage line RVL. The touch sensor TS can be disposed to overlap the reference voltage line bridge pattern RVL_BP. The touch sensor TS can be disposed to overlap the driving voltage line bridge pattern DVL_BP.

The touch routing line TL can be disposed to overlap the driving voltage line DVL. One or more touch routing line TL can be disposed to overlap one driving voltage line DVL.

Alternatively, in some cases, the touch sensor TS can be disposed to overlap the driving voltage line DVL, and the touch routing line TL can be disposed to overlap the reference voltage line RVL.

As the data line DL is disposed by using the second material layer M2 that is the same as the driving voltage line DVL and the reference voltage line RVL, the driving voltage line DVL and the reference voltage line RVL may not be disposed on an area where the data line DL is disposed. A part of the touch sensor TS can be disposed to cross the data line DL.

Almost of the touch sensor TS and the touch routing line TL can be disposed to overlap a voltage line to which a constant voltage for a display driving is supplied among various voltage lines disposed on the subpixel SP.

The voltage line disposed on the touch sensor TS and the touch routing line TL can be positioned under a layer where the first electrode E1 of the light-emitting element ED is disposed.

The voltage line can be positioned between a layer where the touch sensor TS and the touch routing line TL are disposed and a layer where the first electrode E1 of the light-emitting element ED is disposed, it can block that a parasitic capacitance according to a driving of the light-emitting element ED affects the touch sensor TS or the touch routing line TL.

As the voltage line blocks an influence of the parasitic capacitance according to the display driving, the touch sensing can be performed simultaneously with the display driving. Alternatively, by performing the touch sensing in a time period separated from the display driving and blocking a noise by the voltage line, a performance of the touch sensing can be improved.

As the voltage line is a line disposed for a voltage supply for the display driving, thus a structure being capable of improving a performance of the touch sensing can be implemented without adding a separate material layer.

Furthermore, by using a layer where the voltage line is disposed, a touch sensor connecting pattern TS_CP for a connection between the touch sensors TS or a connection between the touch sensor TS and the touch routing line TL can be disposed.

Referring to FIGS. 3, 4 and 5, the touch sensor connecting pattern TS_CP can be disposed by using the second material layer M2.

The touch sensor connecting pattern TS_CP can be disposed to cross the driving voltage line DVL. The touch sensor connecting pattern TS_CP can be disposed not to overlap the reference voltage line RVL.

Alternatively, the touch sensor connecting pattern TS_CP can be disposed to cross the reference voltage line RVL. In this case, the touch sensor connecting pattern TS_CP can be disposed not to overlap the driving voltage line DVL.

The touch sensor connecting pattern TS_CP can be disposed to cross the touch routing line TL. A part of the touch sensor connecting pattern TS_CP can overlap the touch routing line TL.

The touch sensor connecting pattern TS_CP can be electrically connecting between the touch routing line TL and the touch sensor TS. Alternatively, the touch sensor connecting pattern TS_CP can be electrically connecting between touch sensors TS disposed on both sides of the touch routing line TL. Alternatively, in some cases, the touch sensor connecting pattern TS_CP can be disposed to be floated not connecting the touch routing line TL or the touch sensor TS.

For example, a first touch sensor connecting pattern TS_CP1 can be disposed by using the second material layer M2 same as the driving voltage line DVL. The first touch sensor connecting pattern TS_CP1 can cross a first touch routing line TL1 and a second touch routing line TL2.

The first touch sensor connecting pattern TS_CP1 can be electrically connected to the first touch routing line TL1 through a first contact hole CH1. The first touch sensor connecting pattern TS_CP1 can be electrically connected to the touch sensor TS through a second contact hole CH2.

As the first touch sensor connecting pattern TS_CP1 is disposed by using the second material layer M2 used for arranging various voltage lines, a connection structure between the touch sensor TS and the touch routing line TL can be implemented without adding a separate process.

As the driving voltage line DVL is cut on an area where the first touch sensor connecting pattern TS_CP1 is disposed, it can be electrically connected by the driving voltage line bridge pattern DVL_BP disposed by using the fourth material layer M4.

The driving voltage line DVL can be electrically connected to the driving voltage line bridge pattern DVL_BP through a third contact hole CH3 and a fourth contact hole CH4. Two parts of the driving voltage line DVL to be made of the second material layer M2 and be cut can be electrically connected to each other through the driving voltage line bridge pattern DVL_BP.

A second touch sensor connecting pattern TS_CP2 can be disposed not to be electrically connected to the touch sensor TS and the touch routing line TL.

The second touch sensor connecting pattern TS_CP2 can be disposed to cross the driving voltage line DVL, a third touch routing line TL3 and a fourth touch routing line TL4.

The driving voltage line DVL crossing the second touch sensor connecting pattern TS_CP2 can be electrically connected to the driving voltage line bridge pattern DVL_BP through a fifth contact hole CH5 and a sixth contact hole CH6. Two parts of the driving voltage line DVL to be cut can be electrically connected to each other by the driving voltage line bridge pattern DVL_BP.

The touch sensor connecting pattern TS_CP, such as described above, in some cases, can electrically connect between touch sensors TS positioned on both sides of the touch routing line TL.

As the touch sensor connecting pattern TS_CP is disposed by using the second material layer M2, a connection structure between the touch sensors TS and a connection structure between the touch sensor TS and the touch routing line TL can be implemented easily.

As the touch sensor connecting pattern TS_CP is disposed by using the second material layer M2, a pattern made of the second material layer M2 can be disposed between the touch sensor connecting pattern TS_CP and the data line DL.

For example, a pattern made of the second material layer M2 can be disposed between the first touch sensor connecting pattern TS_CP1 and the first data line DL1 The pattern made of the second material layer M2 can be electrically connected to the driving voltage line bridge pattern DVL_BP through a seventh contact hole CH7. As the pattern made of the second material layer M2 becomes a part of the driving voltage line bridge pattern DVL_BP, thus an entire resistance of a line can be reduced. Similarly, a pattern made of the second material layer M2 between the second touch sensor connecting pattern TS_CP2 and the fourth data line DL4 can be electrically connected to the driving voltage line bridge pattern DVL_BP through an eighth contact hole CH8.

Figure 7:
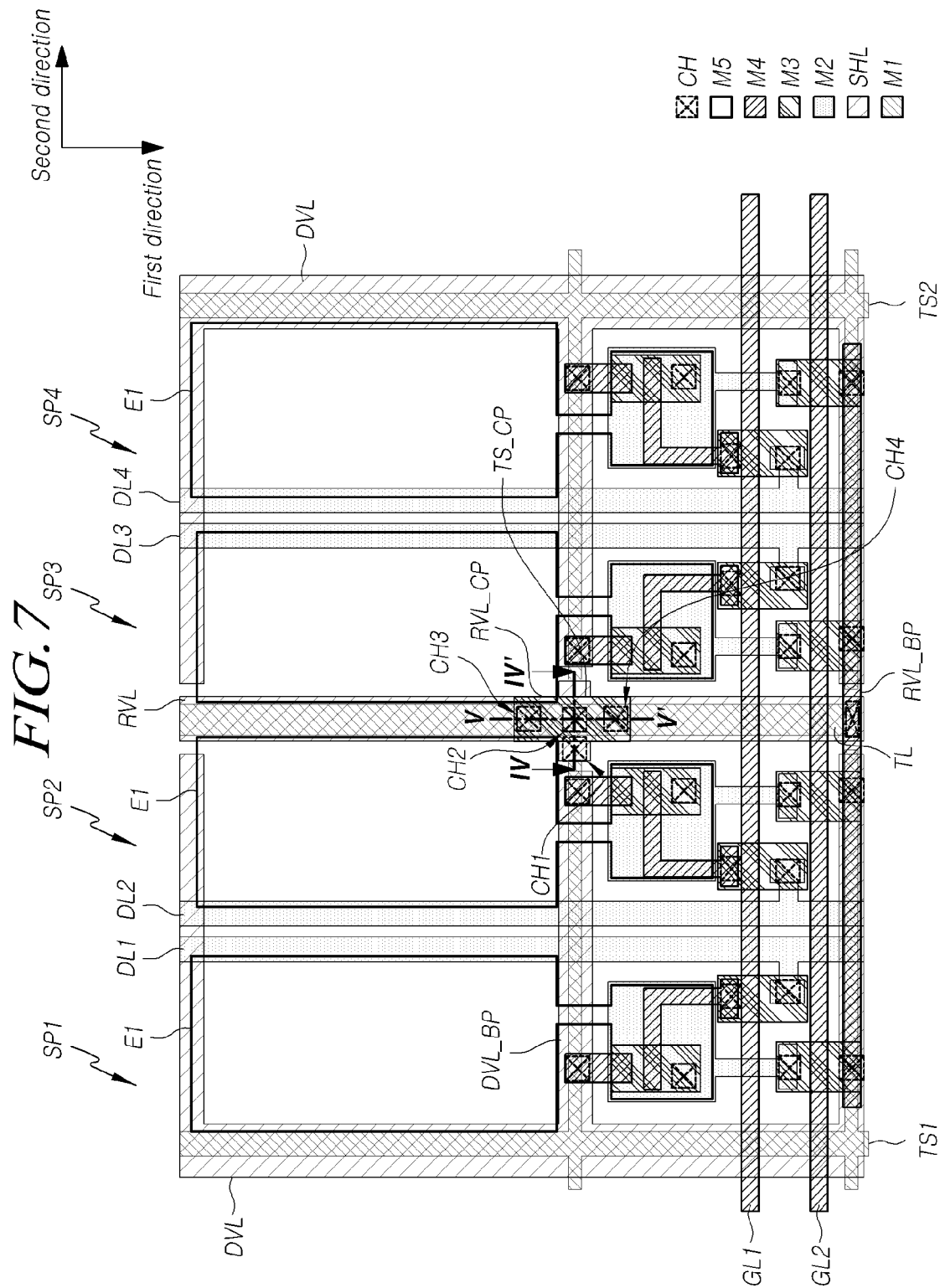
FIG. 7 is a diagram illustrating another example of a plane structure that a touch sensor and a touch routing line are disposed in a touch display device according to embodiments of the present disclosure.
Figure 8:
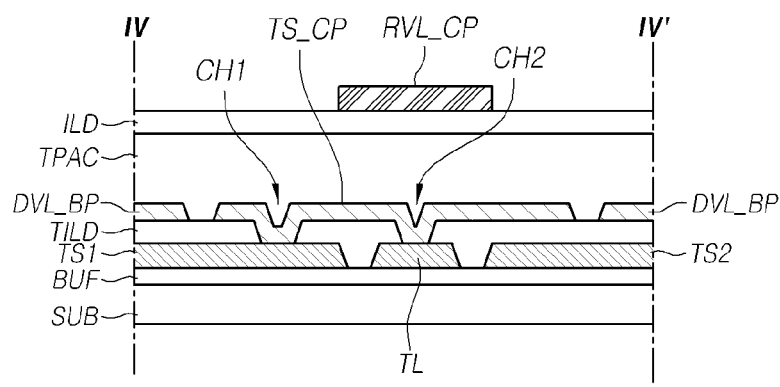
FIG. 8 is a cross-sectional view of IV-IV' portion illustrated in FIG. 7 according to embodiments of the present disclosure.
Figure 9:
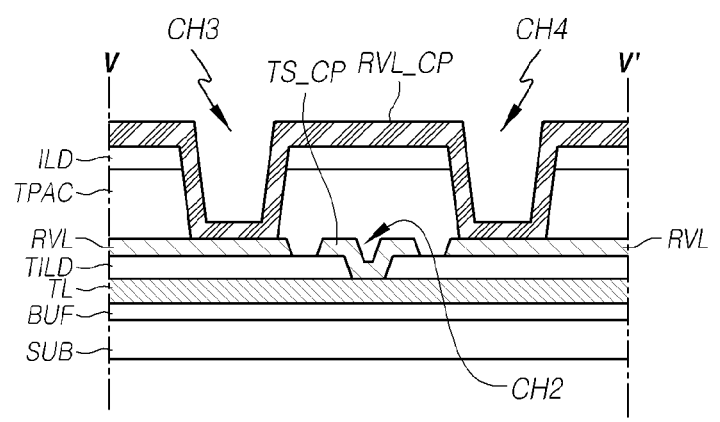
FIG. 9 is a cross-sectional view of V-V' portion illustrated in FIG. 7 according to embodiments of the present disclosure.
Figure 10:
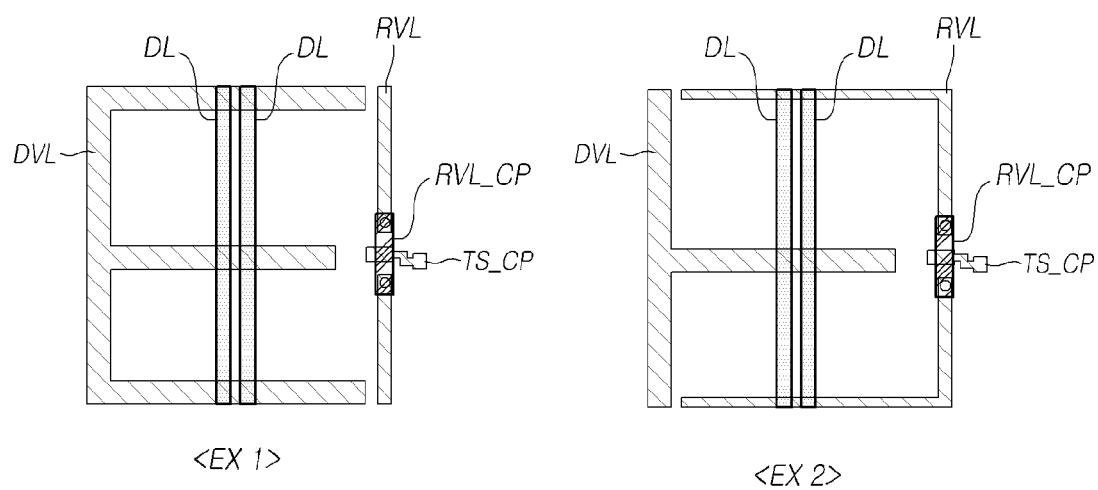
FIG. 10 is a diagram illustrating an example of a structure that a driving voltage line and a reference voltage line are disposed on a subpixel illustrated in FIG. 7 according to embodiments of the present disclosure.

FIG. 7 is a diagram illustrating another example of a plane structure that the touch sensor TS and the touch routing line TL are disposed in the touch display device 100 according to embodiments of the present disclosure. FIG. 8 is a cross-sectional view of IV-IV' portion illustrated in FIG. 7 according to embodiments of the present disclosure. FIG. 9 is a cross-sectional view of V-V' portion illustrated in FIG. 7 according to embodiments of the present disclosure. FIG. 10 is a diagram illustrating an example of a structure that the driving voltage line DVL and the reference voltage line RVL are disposed on the subpixel SP illustrated in FIG. 7 according to embodiments of the present disclosure.

Referring to FIG. 7, in the case that a shield layer SHL is disposed between the first material layer M1 and the second material layer M2, an example of a structure that the touch sensor TS, the touch routing line TL and various voltage lines are disposed is illustrated.

The touch sensor TS and the touch routing line TL can be disposed by using the first material layer M1.

The driving voltage line DVL and the reference voltage line RVL can be disposed by using the shield layer SHL.

The shield layer SHL can be made of a metal material. The shield layer SHL can be disposed between the touch insulating layer TILD and the touch planarization layer TPAC.

The driving voltage line DVL and the reference voltage line RVL can be disposed to overlap at least a part of the touch sensor TS and the touch routing line TL.

The touch sensor connecting pattern TS_CP can be disposed by using the shield layer SHL. The touch sensor connecting pattern TS_CP can be disposed on a layer where the driving voltage line DVL and the reference voltage line RVL are disposed.

The touch sensor connecting pattern TS_CP can be disposed to cross one of the driving voltage line DVL and the reference voltage line RVL (or disposed in crossing direction one of them). The touch sensor connecting pattern TS_CP can be disposed not to overlap another of the driving voltage line DVL and the reference voltage line RVL.

For example, the touch sensor connecting pattern TS_CP can be disposed to cross the reference voltage line RVL.

Alternatively, such as an example above-mentioned through FIG. 3, the touch sensor connecting pattern TS_CP can be disposed to cross the driving voltage line DVL.

In the case that the touch sensor connecting pattern TS_CP is disposed to cross the reference voltage line RVL, the touch routing line TL can be disposed to overlap the reference voltage line RVL. At least a part of the touch routing line TL can be disposed not to overlap the driving voltage line DVL.

The touch sensor TS can be disposed to overlap the driving voltage line DVL. At least a part of the touch sensor TS can be disposed not to overlap the reference voltage line RVL.

A level of the first driving voltage EVDD supplied to the driving voltage line DVL can be greater than a level of the reference voltage Vref supplied to the reference voltage line RVL. A width of the driving voltage line DVL can be greater than a width of the reference voltage line RVL for a resistance reduction.

Since a load of the driving voltage line DVL can be greater, the touch sensor connecting pattern TS_CP and the touch routing line TL can be disposed on an area where the reference voltage line RVL is disposed for an entire load reduction.

The touch sensor connecting pattern TS_CP can connect between touch sensors TS, or between the touch sensor TS and the touch routing line TL on an area crossing the reference voltage line RVL.

For example, the touch sensor connecting pattern TS_CP can be electrically connected to a first touch sensor TS1 through a first contact hole CH1. The touch sensor connecting pattern TS_CP can be electrically connected to the touch routing line TL through a second contact hole CH2.

The touch routing line TL and the first touch sensor TS1 can be electrically connected to each other by the touch sensor connecting pattern TS_CP.

A second touch sensor TS2 can be electrically connected to other touch routing line TL by the touch sensor connecting pattern TS_CP positioned on other area.

Furthermore, the touch sensor connecting pattern TS_CP can electrically connect adjacent touch sensors TS each other, in some cases, can be disposed to be floated.

As the touch sensor connecting pattern TS_CP crosses the reference voltage line RVL, the reference voltage line RVL made of the shield layer SHL can be cut on an area where the touch sensor connecting pattern TS_CP is disposed.

Two parts of the reference voltage line RVL made of the shield layer SHL can be electrically connected by a reference voltage line connecting pattern RVL_CP disposed by using a different layer from the shield layer SHL.

The reference voltage line connecting pattern RVL_CP, for example, can be disposed by using the third material layer M3. In some cases, the reference voltage line connecting pattern RVL_CP can be disposed by using the second material layer M2 or the fourth material layer M4.

The reference voltage line connecting pattern RVL_CP can be electrically connected to the two parts of the reference voltage line RVL disposed by using the shield layer SHL through a third contact hole CH3 and a fourth contact hole CH4.

As the two parts of the reference voltage line RVL are electrically connected to each other by the reference voltage line connecting pattern RVL_CP, a structure that the driving voltage line DVL, the reference voltage line RVL and the touch sensor connecting pattern TS_CP are disposed on a same layer by using the shield layer SHL can be implemented.

The data line DL can be disposed by using the second material layer M2.

Among portions of the driving voltage line DVL, a portion disposed in the second direction can be disposed to cross the data line DL. A part of the touch sensor TS can be disposed on an area where the driving voltage line DVL and the data line DL overlap.

As the driving voltage line DVL is positioned between two layers (of the touch sensor TS and the data line DL) on an area where the touch sensor TS and the data line DL overlap, it can be blocked that a voltage, a signal supplied to the data line DL affects the touch sensor TS.

In some cases, a part of the reference voltage line RVL can be disposed to overlap the data line DL.

For example, referring to FIG. 10, such as <EX 1>, the driving voltage line DVL disposed by using the shield layer SHL can be disposed to cross the data line DL. A formation of a parasitic capacitance can be blocked or reduced on an overlapping area between the data line DL and the touch sensor TS by the driving voltage line DVL.

Alternatively, such as <EX 2>, a part of the reference voltage line RVL can be disposed to cross the data line DL.

The driving voltage line DVL can include a first portion disposed in the first direction and a second portion disposed in the second direction. The reference voltage line RVL can include a first portion disposed in the first direction and the second portion disposed in the second direction. The second portion of the driving voltage line DVL and the second portion of the reference voltage line RVL can be disposed to alternate along the first direction.

As a part of the reference voltage line RVL is disposed to cross the data line DL, a parasitic capacitance can be blocked by the reference voltage line RVL and a resistance of the reference voltage line RVL can be reduced.

Furthermore, in some cases, in the case that the touch sensor connecting pattern TS_CP is positioned on an area where the driving voltage line DVL is disposed, the driving voltage line DVL may not cross the data line DL and the reference voltage line RVL can be disposed to cross the data line DL.

Figure 11A:
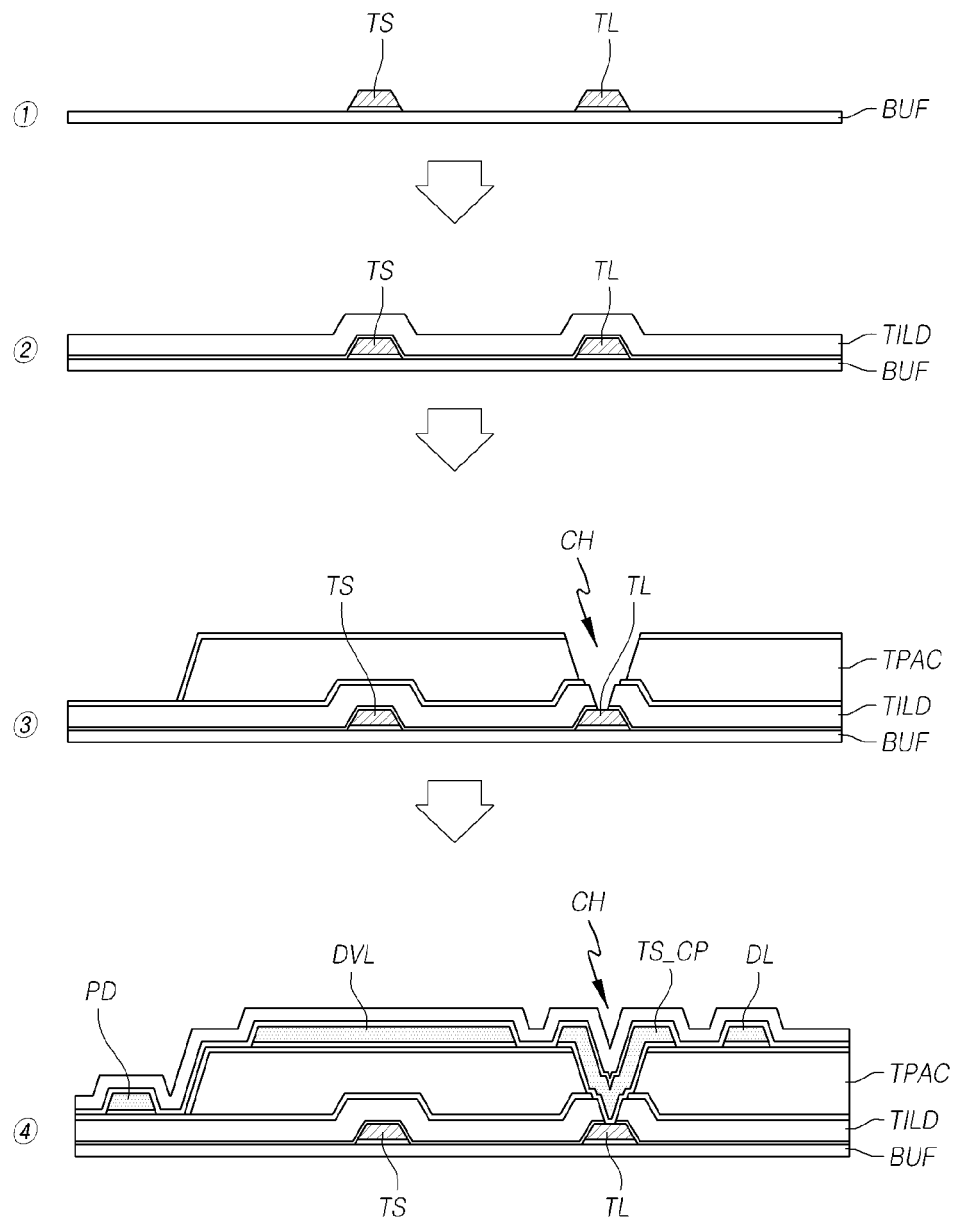
FIGS. 11A and 11B are diagrams illustrating an example of a manufacturing process of a touch display device according to embodiments of the present disclosure.
Figure 11B:
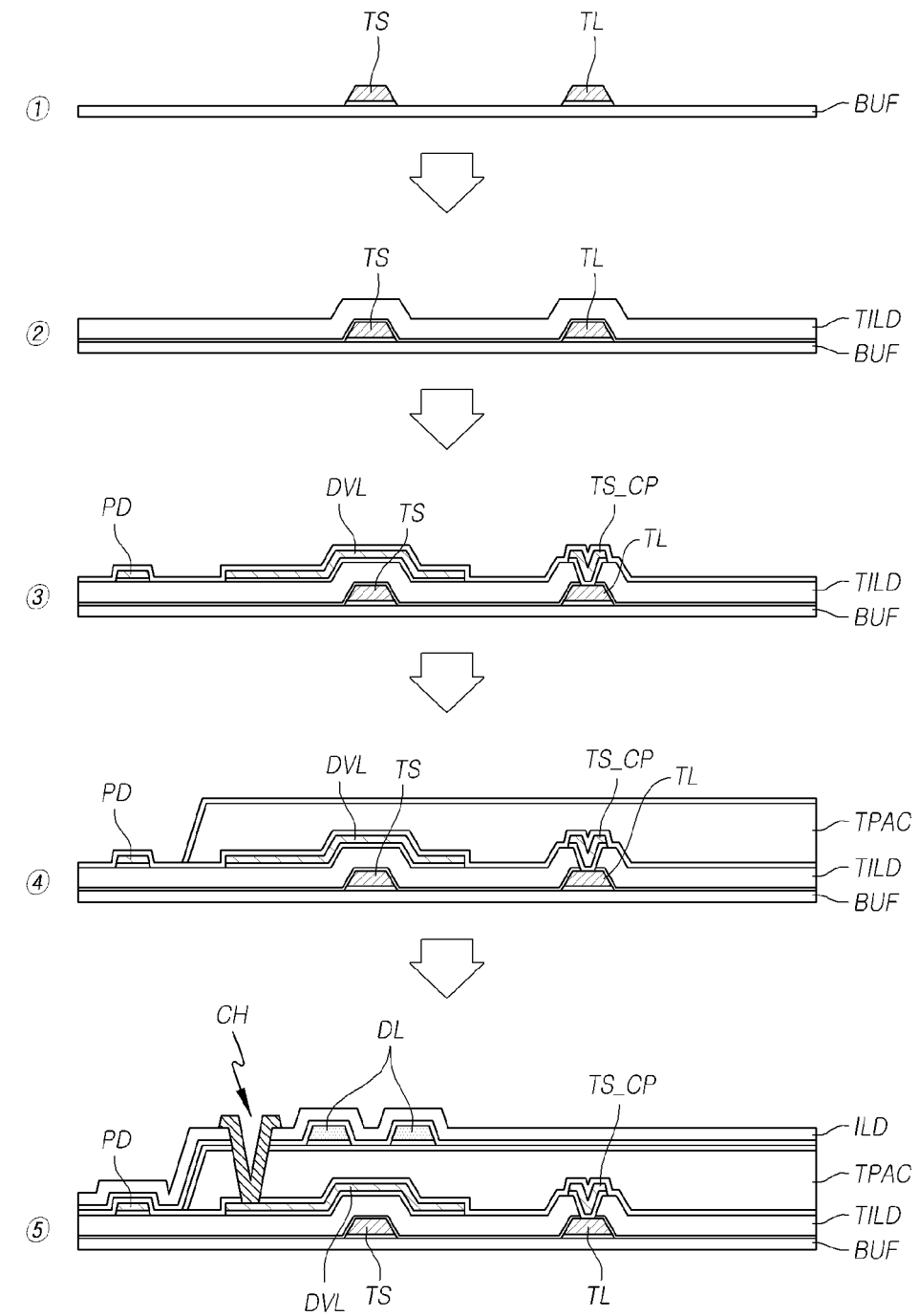

FIGS. 11A and 11B are diagrams illustrating an example of a manufacturing process of the touch display device 100 according to embodiments of the present disclosure.

FIG. 11A illustrates an example of a manufacturing process of the touch display device 100 illustrated in FIG. 3, and FIG. 11B illustrates an example of a manufacturing process of the touch display device 100 illustrated in FIG. 7.

Referring to FIG. 11A, in step ①, the touch sensor TS and the touch routing line TL can be disposed on the buffer layer BUF by using the first material layer M1.

In step ②, the touch insulating layer TILD can be disposed on the touch sensor TS and the touch routing line TL. In some cases, the touch insulating layer TILD may not be disposed.

In step ③, the touch planarization layer TPAC can be disposed on the touch insulating layer TILD, and a contact hole CH can be formed.

In step ④, the driving voltage line DVL, the touch sensor connecting pattern TS_CP, and the data line DL can be disposed on the touch planarization layer TPAC by using the second material layer M2. A pad PD can be disposed by using the second material layer M2, and the pad PD can be a pad PD connected to the data line DL. Alternatively, the pad PD can be a pad PD connected to the touch routing line TL.

Furthermore, the reference voltage line RVL can be disposed by using the second material layer M2.

Thus, for arranging a structure for a touch sensing, as only manufacturing processes that the first material layer M1 and some insulating layers are disposed are added, thus the structure for the touch sensing can be implemented inside of the display panel 110 while reducing the manufacturing process.

Furthermore, as a direct parasitic capacitance between the touch sensor TS and touch routing line TL and a first electrode E1 of the light-emitting element ED or the data line DL is blocked or reduced by the driving voltage line DVL or the reference voltage line RVL, thus a performance of the touch sensing can be improved.

The driving voltage line DVL, the reference voltage line RVL and the touch sensor connecting pattern TS_CP can be disposed by adding a separate shield layer SHL.

Referring to FIG. 11B, a same manufacturing process as the manufacturing process described through FIG. 11A can be performed in step ① and step ②.

In step ③, the driving voltage line DVL and the touch sensor connecting pattern TS_CP can be disposed on the touch insulating layer TILD by using the shield layer SHL. The pad PD can be disposed by using the shield layer SHL. The pad PD can be a pad PD connected to a line for the display driving or a pad PD connected to a line for the touch sensing.

Furthermore, the reference voltage line RVL can be disposed by using the shield layer SHL.

In step ④, the touch planarization layer TPAC can be disposed on the driving voltage line DVL and the touch sensor connecting pattern TS_CP.

In step ⑤, the data line DL can be disposed on the touch planarization layer TPAC by using the second material layer M2. The driving voltage line DVL or the reference voltage line RVL can be positioned between the data line DL and the touch sensor TS.

The driving voltage line DVL or the reference voltage line RVL can be electrically connected to a circuit element such as a thin film transistor disposed on the touch planarization layer TPAC.

As the driving voltage line DVL and the reference voltage line RVL are disposed by using the shield layer SHL, thus they can block or reduce a parasitic capacitance formed according to the display driving in a more adjacent area to the touch sensor TS or the touch routing line TL.

As the driving voltage line DVL and the reference voltage line RVL are not disposed on a layer where the data line DL is disposed, an arrangement of other signal lines can be easier by using a layer where the second material layer M2 is disposed.

The embodiments of the present disclosure described above will be briefly described as follows.

A touch display device 100 according to embodiments of the present disclosure can include a plurality of touch sensors TS disposed in a display panel 110, a plurality of touch routing lines TL electrically connected to at least one of the plurality of touch sensors TS, at least one voltage line disposed to overlap at least a part of the plurality of touch sensors TS or the plurality of touch routing lines TL and configured to supply a constant voltage, and a touch sensor connecting pattern TS_CP disposed on a layer where the at least one voltage line is disposed and electrically connected to at least one of the plurality of touch sensors TS or the plurality of touch routing lines TL.

The touch sensor connecting pattern TS_CP can be disposed to cross the at least one voltage line.

The at least one voltage line can include a first voltage line and a second voltage line, and one of the first voltage line and the second voltage line can be disposed to cross the touch sensor connecting pattern TS_CP, and another of the first voltage line and the second voltage line may not overlap the touch sensor connecting pattern TS_CP.

A voltage line crossing the touch sensor connecting pattern TS_CP among the first voltage line and the second voltage line can overlap at least a part of the plurality of touch routing lines TL.

A width of the first voltage line can be greater than a width of the second voltage line, and the touch sensor connecting pattern TS_CP can be disposed to cross the second voltage line.

A level of a voltage supplied to the first voltage line can be greater than a level of a voltage supplied to the second voltage line, and the touch sensor connecting pattern TS_CP can be disposed to cross the second voltage line.

One of the first voltage line and the second voltage line can be electrically connected to a voltage line connecting pattern disposed on a layer different from a layer where the touch sensor connecting pattern TS_CP is disposed on an area where the one of the first voltage line and the second voltage line crosses the touch sensor connecting pattern TS_CP.

The touch display device 100 can further include a plurality of data lines DL disposed on a layer where the touch sensor connecting pattern TS_CP is disposed, and at least one of the plurality of data lines DL can be disposed between the first voltage line and the second voltage line.

In this case, a part of at least one of the plurality of touch sensors TS can overlap a part of at least one of the plurality of data lines DL on an area between the first voltage line and the second voltage line.

Alternatively, the touch display device 100 can further include a plurality of data lines DL disposed on a layer different from a layer where the touch sensor connecting pattern TS_CP is disposed, and a part of at least one of the first voltage line or the second voltage line can be disposed to cross at least one of the plurality of data lines DL.

In this case, a part of at least one of the plurality of touch sensors TS can be disposed on an area where at least one of the first voltage line or the second voltage line overlaps at least one of the plurality of data lines DL.

Each of the first voltage line and the second voltage line can include a first portion disposed along a first direction and a second portion extended from the first portion along a second direction crossing the first direction, and the second portion of the first voltage line and the second portion of the second voltage line can be disposed to alternate along the first direction.

The touch display device 100 further include a touch planarization layer TPAC on the plurality of touch sensors TS and the plurality of touch routing lines TL, and the at least one voltage line can be disposed on the touch planarization layer TPAC.

Alternatively, the at least one voltage line can be disposed under the touch planarization layer TPAC.

In this case, the at least one voltage line can be electrically connected to a circuit element positioned on the touch planarization layer TPAC through a contact hole included in the touch planarization layer TPAC.

A touch display device 100 according to embodiments of the present disclosure can include a plurality of touch sensors TS and a plurality of touch routing lines TL on a substrate SUB, a touch planarization layer TPAC on the plurality of touch sensors TS and the plurality of touch routing lines TL, at least one voltage line on the touch planarization layer TPAC and overlapping at least a part of the plurality of touch sensors TS or the plurality of touch routing lines TL, and a touch sensor connecting pattern TS_CP disposed on a layer where the at least one voltage line is disposed and electrically connected to at least one of the plurality of touch sensors TS or the plurality of touch routing lines TL.

A touch display device 100 according to embodiments of the present disclosure can include a plurality of touch sensors TS and a plurality of touch routing lines TL on a substrate SUB, at least one voltage line on the plurality of touch sensors TS and the plurality of touch routing lines TL and overlapping at least a part of the plurality of touch sensors TS or the plurality of touch routing lines TL, and a touch sensor connecting pattern TS_CP disposed on an area other than an area where the at least one voltage line is disposed on a layer where the at least one voltage line is disposed and electrically connected to at least one of the plurality of touch sensors TS or the plurality of touch routing lines TL.

The touch display device 100 can further include a touch planarization layer TPAC on the at least one voltage line and the touch sensor connecting pattern TS_CP, and a plurality of data lines DL on the touch planarization layer TPAC.

A part of at least one of the plurality of data lines DL can overlap a part of the at least one voltage line.

A part of at least one of the plurality of touch sensors TS can overlap an area where a part of at least one of the plurality of data lines DL and a part of the at least one voltage line overlap with each other.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device, comprising:
a plurality of touch sensors in a display panel;
a plurality of touch routing lines electrically connected to the plurality of touch sensors;
at least one voltage line overlapping at least a part of the plurality of touch sensors or the plurality of touch routing lines, the at least one voltage line configured to supply a substantially constant voltage; and a touch sensor connecting pattern electrically connected to at least one of the plurality of touch sensors or the plurality of touch routing lines, the touch sensor connecting pattern and the at least one voltage line on a same surface of a layer.

2. The touch display device of claim 1, wherein the touch sensor connecting pattern crosses the at least one voltage line.

3. The touch display device of claim 1, wherein the at least one voltage line comprises a first voltage line and a second voltage line, and
wherein one of the first voltage line and the second voltage line crosses the touch sensor connecting pattern, and another of the first voltage line and the second voltage line is non-overlapping with the touch sensor connecting pattern.

4. The touch display device of claim 3, wherein one of the first voltage line and the second voltage line that crosses the touch sensor connecting pattern overlaps at least a part of the plurality of touch routing lines.

5. The touch display device of claim 3, wherein a width of the first voltage line is greater than a width of the second voltage line, and the touch sensor connecting pattern crosses the second voltage line.

6. The touch display device of claim 3, wherein a level of a voltage supplied to the first voltage line is greater than a level of a voltage supplied to the second voltage line, and the touch sensor connecting pattern crosses the second voltage line.

7. The touch display device of claim 3, wherein one of the first voltage line and the second voltage line is electrically connected to a voltage line connecting pattern that is on a layer that is different from a layer where the touch sensor connecting pattern is on an area where the one of the first voltage line and the second voltage line crosses the touch sensor connecting pattern.

8. The touch display device of claim 3, further comprising:
a plurality of data lines on a same layer as the touch sensor connecting pattern, at least one of the plurality of data lines between the first voltage line and the second voltage line.

9. The touch display device of claim 8, wherein a part of at least one of the plurality of touch sensors overlaps a part of at least one of the plurality of data lines on an area between the first voltage line and the second voltage line.

10. The touch display device of claim 3, further comprising:
a plurality of data lines on a different layer from the touch sensor connecting pattern, and
wherein a part of at least one of the first voltage line or the second voltage line crosses at least one of the plurality of data lines.

11. The touch display device of claim 10, wherein a part of at least one of the plurality of touch sensors is on an area where at least one of the first voltage line or the second voltage line overlaps at least one of the plurality of data lines.

12. The touch display device of claim 10, wherein each of the first voltage line and the second voltage line comprises a first portion extending along a first direction and a second portion extended from the first portion along a second direction that crosses the first direction, and wherein the second portion of the first voltage line and the second portion of the second voltage line alternate along the first direction.

13. The touch display device of claim 1, further comprising:
a touch planarization layer on the plurality of touch sensors and the plurality of touch routing lines,
wherein the at least one voltage line is on the touch planarization layer.

14. The touch display device of claim 1, further comprising:
a touch planarization layer on the plurality of touch sensors and the plurality of touch routing lines,
wherein the at least one voltage line is under the touch planarization layer.

15. The touch display device of claim 14, wherein the at least one voltage line is electrically connected to a circuit element positioned on the touch planarization layer through a contact hole included in the touch planarization layer.

16. A touch display device, comprising:
a plurality of touch sensors and a plurality of touch routing lines on a substrate;
a touch planarization layer on the plurality of touch sensors and the plurality of touch routing lines;
at least one voltage line on a surface of the touch planarization layer, the at least one voltage line overlapping at least a part of the plurality of touch sensors or the plurality of touch routing lines; and
a touch sensor connecting pattern on a same surface of the planarization layer as the at least one voltage line, the touch sensor connecting pattern electrically connected to at least one of the plurality of touch sensors or the plurality of touch routing lines.

17. A touch display device, comprising:
a plurality of touch sensors and a plurality of touch routing lines on a substrate;
at least one voltage line on the plurality of touch sensors and the plurality of touch routing lines, the at least one voltage line overlapping at least a part of the plurality of touch sensors or the plurality of touch routing lines; and
a touch sensor connecting pattern on an area other than an area where the at least one voltage line is disposed, and the touch sensor connecting pattern and the at least one voltage line on a same surface of a layer, the touch sensor connecting pattern electrically connected to at least one of the plurality of touch sensors or the plurality of touch routing lines.

18. The touch display device of claim 17, further comprising:
a touch planarization layer on the at least one voltage line and the touch sensor connecting pattern; and
a plurality of data lines on the touch planarization layer.

19. The touch display device of claim 18, wherein a part of at least one of the plurality of data lines overlaps a part of the at least one voltage line.

20. The touch display device of claim 19, wherein a part of at least one of the plurality of touch sensors overlaps an area where a part of at least one of the plurality of data lines and a part of the at least one voltage line overlap with each other.

* * * * *